United States Patent [19]

Lockwood

[11] 4,332,330
[45] Jun. 1, 1982

[54] ELECTRICAL CUT-IN BOX

[75] Inventor: Alan C. Lockwood, Rosemead, Calif.

[73] Assignee: Norris Industries, Inc., Los Angeles, Calif.

[21] Appl. No.: 858,437

[22] Filed: Dec. 7, 1977

[51] Int. Cl.³ .............................................. H02G 3/14
[52] U.S. Cl. ..................................... 220/3.5; 220/3.4; 220/3.6
[58] Field of Search ........................ 220/3.5, 3.4, 3.6

[56] References Cited

U.S. PATENT DOCUMENTS

| | | | |
|---|---|---|---|
| 2,272,846 | 2/1942 | Lindstrom | 220/3.4 X |
| 2,374,993 | 5/1945 | Haynes | 220/3.6 |
| 2,430,067 | 11/1947 | Loy | 220/3.6 |
| 2,769,562 | 11/1956 | Rudolph | 220/3.4 |
| 2,957,598 | 10/1960 | Menkee | 220/3.6 |
| 3,448,952 | 6/1969 | Swanquist et al. | 220/3.5 X |

Primary Examiner—Steven M. Pollard
Attorney, Agent, or Firm—Edward A. Sokolski

[57] ABSTRACT

An electrical cut-in box particularly for use as a switch box or the like in remodeling wiring where access to the wall studs is difficult and the box must be clamped between the inner and outer surfaces of the wall. The box employs a pair of clamping members formed from folding side cleats, screws which threadably engage the cleats, and a bracket assembly for supporting each screw and its associated cleat on the side walls of the box. The bracket assemblies are pre-assembled and have a flat surface from which a prong extends at an angle which enables insertion of the assembly into the box through an opening formed therein but which prevents the screw and cleat from separating from the box during shipping or handling. Each bracket assembly has a hook which extends from the top portion thereof and engages a strap formed along the top wall of the box which keeps the screw along the side of the box while the clamp is being tightened thereby. The screw is structurally adapted so that it cannot be inadvertently detached from its bracket assembly either during handling or installation of the box.

4 Claims, 6 Drawing Figures

ELECTRICAL CUT-IN BOX

This invention relates to cut-in or "old work" electrical boxes, and more particularly to such a box employing foldable side cleats which are tightened by means of screws to clamp the box to a wall.

Cut-in or "old work" electrical boxes have been in use for some years in situations where the box is installed on an existing wall and access to the wall studs is difficult or impossible, such as in remodeling jobs. Prior art boxes of this type are described in the following U.S. Pat. No. 1,957,844 to Olsen et al.; U.S. Pat. No. 2,272,846 to Lindstrom; U.S. Pat. No. 2,299,696 to Gregersen; U.S. Pat. No. 2,867,344 to Nickell; U.S. Pat. No. 2,801,019 to DeRonck; and U.S. Pat. No. 2,870,931 to Buckels. In the above listed patents to Olsen et al. and Lindstrom, boxes are shown which employ foldable side cleats which are threadably engaged by a screw mounted on an assembly wherein the cleats are held flat against the walls of the box while it is being passed through a cut-out in the wall, and then once the box is placed in proper installation position are moved so that they are substantially parallel to the inner wall surface against which they can then be clamped by means of the associated screws.

The present invention is an improvement over the boxes of Lindstrom and Olsen et al. and overcomes the following shortcomings of these prior art boxes. First, in these prior art boxes, no means is provided for preventing the screw head or the top portion of its support assembly from falling away from the box walls while the screw is being used to draw the cleat against the inner wall surface. This requires that the bracket assembly be manually held in position during this clamping operation, which is often inconvenient and in certain installations where there is limited access, somewhat difficult. Further, it is desirable that the screws and clamping cleat assemblies be held to the box during shipping and handling so as to facilitate the handling and use of the box. In certain prior art boxes of this general type, means for achieving this end result are not provided. In others, this is achieved by assembling the screw and its support assembly on the box. This adds time and cost to the manufacture of the unit. Also, in certain prior art boxes of this type, adequate means are not provided for preventing the screws from becoming detached from their support assemblies and cleats during handling and installation.

The electrical box of the present invention overcomes the aforementioned shortcomings of the prior art in the following manner: First, a hook member is provided on the screw support assembly, this hook member engaging a strap formed along the top edge of the box, thereby retaining the screw in proper position along the box wall during installation. Secondly, the device of the present invention is constructed with a prong which extends from the screw support bracket assembly, this prong being angulated away from the wall of this assembly such that it permits the assembly to be forced through a cut-out in the wall of the box to the inside of the box, yet prevents removal thereof in the opposite direction once so installed. Thirdly, means including a ringed portion directly beneath the head of the screw and a retainer prong which extends from the bracket assembly and engages the ringed portion so as to prevent the screw from being inadvertently detached from its support assembly or associated cleat member. A bullet shaped nose on the end of the screw may also be used to perform this function.

It is therefore an object of this invention to provide an improved cut-in electrical switch box which can be clamped to a wall.

It is a further object of this invention to facilitate installation and handling of cut-in electrical boxes.

Other objects of this invention will become apparent as the description proceeds in connection with the accompanying drawings, of which:

Briefly described, my invention is as follows: An electrical box of the cut-in type for use in such applications as remodeling, has a pair of slots formed in opposite walls thereof, a strap being provided across the top edges of each of such slots. A pair of clamping assemblies, each of which includes a cleat member in the form of a flat plate and a screw-bracket assembly, is provided for clamping the box between the front and rear surfaces of a wall. Each of the screw-bracket assemblies is installed along an associated one of the slots, these assemblies having prongs thereon which permit the assemblies to be forced through the slots to the interior of the box, but once so installed, prevent detachment of these assemblies from the box. Hook means are provided at the top portions of the screw-bracket assemblies, these hook means engaging an associated one of the straps formed in the box across the top edges of the slots. The box is installed by initially passing it through the wall aperture made to receive the box, with the cleats flat against the outer wall surfaces of the box and the screw and screw-bracket assemblies extending across the inside of the box. In this position the cleats are prevented from sliding up the sides of the box by pairs of lances formed in such sides. The box has a pair of lip portions which engage the outside surface of the wall, the screw bracket assemblies being brought upwardly so that their hook portions engage the associated box straps, the cleats now being substantially perpendicular to the outer surfaces of the box. With the box and the clamping assemblies in this position, the screws are then tightened to draw the cleats tightly against the inner surfaces of the wall with the aforementioned box lip portions abutting against the outer surface of the wall. The portions of the screws directly beneath the heads thereof have rings formed therein rather than threads, there being a retainer prong which extends from each bracket assembly and engages one of these rings so as to prevent the screw from inadvertently being detached from its support bracket or associated cleat. The screws may alternatively have bullet shaped noses which operate to perform this function.

Figure 1:
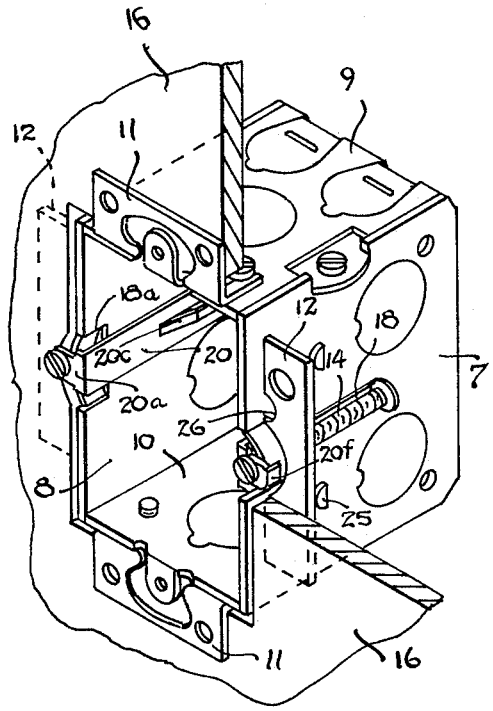
FIG. 1 is a perspective view showing a preferred embodiment of the invention installed on a wall.
Figure 2:
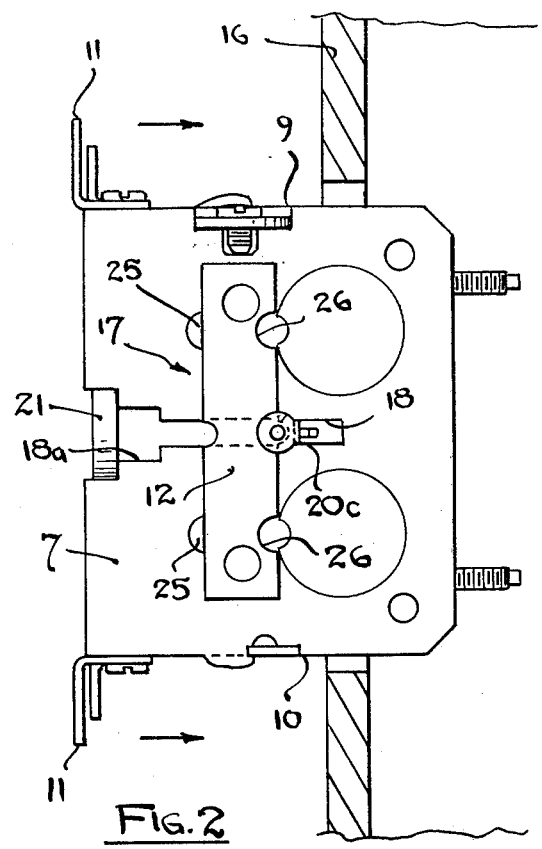
FIG. 2 is a side elevational view showing the preferred embodiment in the process of being installed.

Referring now to the FIGS, a preferred embodiment of the invention is illustrated. The box has a pair of opposite side walls 7 and 8, and end walls 9 and 10. End walls 9 and 10 have lip portions 11 attached thereto, these lip portions abutting against the outer surface of the wall 16 when the box is clamped to such wall as shown in FIG. 1. Side walls 7 and 8 have longitudinal slots 18 formed therein, these slots having a widened portion 18a near the tops thereof to permit the insertion of the screw-bracket assembly into the box, as to be explained further on in the specification. Looped straps 21 are provided above slot portions 18a. Half-moon shaped lances 25 extend outwardly from side walls 7 and 8 and act to prevent the cleats from sliding up the walls while the box is being inserted in the wall, as shown in FIG. 2.

Figure 5A:
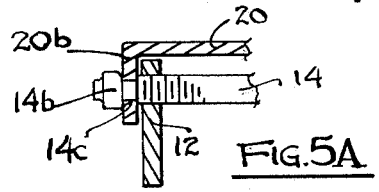
FIG. 5A is a cutaway view showing an alternate screw nose structure which may be used in the device of the invention to prevent separation of the screw from the bracket assembly.
Figure 5:
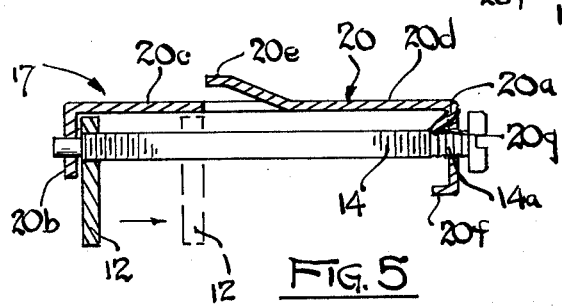
FIG. 5 is a side view illustrating the bracket assembly of the preferred embodiment.

Clamping assemblies 17 are provided for clamping the box to a wall with cleats 12 abutting against the inner surface of the wall and lip portions 11 abutting against the outer surface thereof. Each of assemblies 17 includes a cleat 12 which is threadably engaged by a screw 14, these cleats being drawn against the inner surface of wall 16 when the screws are tightened. The cleats have cut-outs 26 along one of their edges, which permit their passage by lances 25 as the cleats are drawn along walls 7 and 8. Each of screws 14 is mounted on an associated bracket assembly 20 with the shank portion of the screw fitted through a first tab 20a on the top end of the bracket and a second tab 20b at the bottom end thereof. The brackets further have flat strip portions 20d and tail portions 20c which extend from strip portions 20d. A prong 20e is formed in each of strip portions 20d from a cut-out portion thereof, prongs 20e extending from the surface of the associated strip at an acute angle relative thereof. This enables the preassembly of the screws in assemblies 17 and the installation of these assemblies in retention on the box. This is achieved by forcing the prongs through widened box apertures 18a, the prongs then preventing passage of assemblies 17 through the apertures in the reverse direction. A hook 20f extends downwardly from the end of each of tabs 20a. Screws 14 are retained in their associated brackets 20 by virtue of a ringed portion 14a near the head of the screw which is engaged by retainer prong 20g extending from a corner of the bracket assembly, as can best be seen in FIG. 5. Referring now to FIG. 5A, alternative means for retaining the screws in their bracket assemblies is shown. The end portion 14b of the screw is bullet shaped, there being an undercut portion 14c adjacent thereto which rides in the apertured portion of tab 20b. End portion 14b is forced through the tab aperture to bring portion 14c to a position rotatably retained in the aperture, as shown in FIG. 5A.

Figure 4:
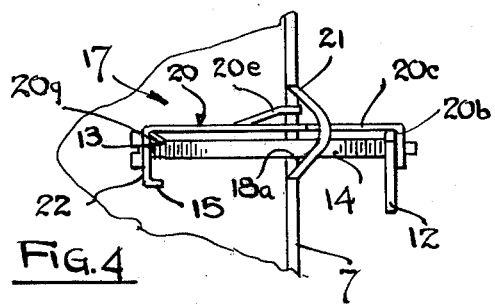
FIG. 4 is a side view showing the bracket assembly being installed in the box.

The screws and their support assemblies are retained to the box during shipping and handling by virtue of prongs 20e which extend out from the strip portions 20d. These prongs are made such that it is possible to force the brackets through the widened slot portions 18a thereof to bring the strip portions 20d to the inside of the box, as shown in FIG. 4, but then preventing the brackets from passing through the slots in an opposite direction, thereby retaining the brackets to the box.

Figure 3:
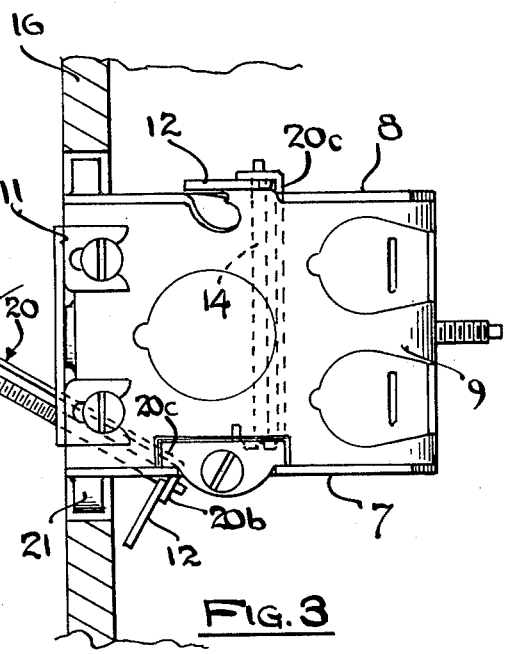
FIG. 3 is an end view of the preferred embodiment showing the screw and cleat bracket assembly in the process of being moved to the installation position.

The box is clamped to a wall in the following manner: First, the box is installed through the aperture provided therefor in the wall 16 with the cleats 12 flat against the side walls of the box and the brackets and screws extending across the inside of the box as shown in FIG. 2. Lances 25 on the sides of the box prevent the cleats from sliding up the sides during such installation. Once the box has been placed in position for installation, the brackets with their screws mounted therein are moved to a position alongside the side walls of the box, as shown being done for one of the brackets in FIG. 3, with hook portions 20f engaging looped straps 21, thereby retaining the cleats, brackets and screws in such position. The screws 14 are then driven so as to draw cleats 12 towards the screw heads until the box is tightly clamped in position with lip portions 11 abutting against the outside surfaces of wall 16 and cleats 12 abutting against the inside surfaces of the wall as shown in FIG. 1. The screws are prevented from inadvertently being disengaged from their associated cleats and bracket tabs either by virtue of the bullet nose 14b given to the bottom end of the screw shank, as shown in FIG. 5A, or the rings 14a formed directly beneath the head of the screw, one of which is engaged by prong 20g, as can best be seen in FIG. 5.

While the invention has been described and illustrated in detail, it is to be clearly understood that this is intended by way of illustration and example only, and is not to be taken by way of limitation, the spirit and scope of this invention being limited only by the terms of the following claims.

I claim:

1. In an open ended electrical box having a pair of opposite side walls with elongated slots formed therein and a strap bridging the ends of said slots, means for clamping said box between the inside and outside surfaces of a wall, comprising:

a bracket fitted in each of slots, each of said brackets including a flat strip, a tab at each end of said strip extending substantially perpendicularly therefrom, said tabs having apertures formed therein, one of said tabs having a hook thereon, said hook extending in a direction substantially parallel to said flat strip and substantially normal to said tabs, the flat strips of the brackets having prongs extending outwardly therefrom at an acute angle relative thereto, said slots having widened portions through which the prongs can be forced, said prongs preventing the brackets from separating from the box once they are forced through the widened slot portions, a screw mounted on each of said brackets with the shank thereof fitted through the apertures in said tabs, the head of said screw being adjacent to said one of said tabs having a hook thereon, a cleat in the form of a flat plate threadably engaged by each of said screws, said hooks being slipped over and loosely engaging said straps thereby maintaining the screws alongside the side walls of the box while said screws are being tightened, said box having lips extending outwardly from the edges thereof, whereby when said screws are tightened, the cleats are drawn towards the inside surface of the wall to clamp the wall between the cleats and the lips of the box.

2. In an open ended electrical box having a pair of opposite side walls with elongated slots formed therein and a strap bridging the ends of said slots, means for clamping said box between the inside and outside surfaces of a wall, comprising:

a bracket fitted in each of slots, each of said brackets including a flat strip, a tab at each end of said strip extending substantially perpendicularly therefrom, said tabs having apertures formed therein, one of said tabs having a hook thereon, said hook extending in a direction substantially parallel to said flat strip and substantially normal to said tabs, a screw mounted on each of said brackets with the shank thereof fitted through the apertures in said tabs, the head of said screw being adjacent to said one of said tabs having a hook thereon, the portion of the screw shanks adjacent to the heads of said screws having a plurality of rings formed therein, a prong extending from said brackets and engaging one of the rings of said screws to prevent longitudinal movement of said screws relative to said tabs as the screws are rotated, a cleat in the form of a flat plate threadably engaged by each of said screws, said hooks being slipped over and loosely engaging said straps thereby maintaining the screws alongside the side walls of the box while said screws are being tightened, said box having lips extending outwardly from the edges thereof, whereby when said screws are tightened, the cleats are drawn towards the inside surface of the wall to clamp the wall between the cleats and the lips of the box.

3. In an open ended electrical box having a pair of opposite side walls with elongated slots formed therein and a strap bridging the ends of said slots, means for clamping said box between the inside and outside surfaces of a wall, comprising:

a bracket fitted in each of slots, each of said brackets including a flat strip, a tab at each end of said strip extending substantially perpendicularly therefrom, said tabs having apertures formed therein, one of said tabs having a hook thereon, said hook extending in a direction substantially parallel to said flat strip and substantially normal to said tabs, a screw mounted on each of said brackets with the shank thereof fitted through the apertures in said tabs, the head of said screw being adjacent to said one of said tabs having a hook thereon, the ends of the shanks of said screws being bullet nosed and having an undercut portion inward of the bullet nose which rides in the aperture of one of the tabs, the bullet noses preventing longitudinal movement of the screws relative to the tabs as the screws are rotated, a cleat in the form of a flat plate threadably engaged by each of said screws, said hooks being slipped over and loosely engaging said straps thereby maintaining the screws alongside the side walls of the box while said screws are being tightened, said box having lips extending outwardly from the edges thereof, whereby when said screws are tightened, the cleats are drawn towards the inside surface of the wall to clamp the wall between the cleats and the lips of the box.

4. In an open ended electrical box having a pair of opposite side walls with elongated slots formed therein and a strap bridging the ends of said slots, means for clamping said box between the inside and outside surfaces of a wall, comprising:

a bracket fitted in each of slots, each of said brackets including a flat strip, a tab at each end of said strip extending substantially perpendicularly therefrom, said tabs having apertures formed therein, one of said tabs having a hook thereon, said hook extending in a direction substantially parallel to said flat strip and substantially normal to said tabs, a screw mounted on each of said brackets with the shank thereof fitted through the apertures in said tabs, the head of said screw being adjacent to said one of said tabs having a hook thereon, a cleat in the form of a flat plate threadably engaged by each of said screws, lances being formed along the side walls of the box, said lances extending outwardly from said side walls and engaging said cleats to prevent their movement in a predetermined direction when the box is placed in position for clamping, said hooks being slipped over and loosely engaging said straps thereby maintaining the screws alongside the side walls of the box while said screws are being tightened, said box having lips extending outwardly from the edges thereof, whereby when said screws are tightened, the cleats are drawn towards the inside surface of the wall to clamp the wall between the cleats and the lips of the box.

* * * * *